US009031284B2

(12) United States Patent
Spath

(10) Patent No.: US 9,031,284 B2
(45) Date of Patent: May 12, 2015

(54) IMPLANT IDENTIFICATION SYSTEM AND METHOD

(71) Applicant: William Bradley Spath, Costa Mesa, CA (US)

(72) Inventor: William Bradley Spath, Costa Mesa, CA (US)

(*) Notice: Subject to any disclaimer, the term of this patent is extended or adjusted under 35 U.S.C. 154(b) by 292 days.

(21) Appl. No.: 13/730,038

(22) Filed: Dec. 28, 2012

(65) Prior Publication Data

US 2014/0185865 A1   Jul. 3, 2014

(51) Int. Cl.
*G06K 9/00* (2006.01)
*G06T 7/00* (2006.01)

(52) U.S. Cl.
CPC ............... *G06T 7/004* (2013.01); *G06T 7/0075* (2013.01); *G06T 2207/10012* (2013.01); *G06T 2207/10116* (2013.01); *G06T 2207/30052* (2013.01)

(58) Field of Classification Search
CPC .................. G06T 7/0012; G06T 2207/10012; G06T 7/0075; G06T 2207/10116; G06T 2207/30052; G06T 7/004
USPC .................................................. 382/100, 103
See application file for complete search history.

(56) References Cited

U.S. PATENT DOCUMENTS 6,904,310 B2 *   6/2005   Knapp et al. .................. 600/431
2006/0232408 A1   10/2006   Nycz et al.
2007/0272747 A1   11/2007   Woods et al.
2009/0155744 A1   6/2009   Jandali
2010/0203478 A1 *   8/2010   Rubbert ..................... 433/212.1

OTHER PUBLICATIONS

Old Orthopedic Implant X-Rays; www.facebook.com/pages/Old-Orthopedic-Implant-X-Rays/168348626519962; 2012;3 pages.
Groeger, Lena; How Does the FDA Monitor Your Medical Implants? It Doesn't, Really; www.propublica.org/article/how-does-the-fda-monitor-your-medical-implants; May 3, 2012; 4 pages.
Hanser, Carl; Drum prufe, wer sich ewig bindet; Messen und Prufen; QZ Jahrgang 57; 2012; pp. 34-36.
Nuzzolese, E. et al.; Radiographic Dental Implants Recognition for Geographic Evaluation in Human Identification; 2008; pp. 8-11.
Shapi'I, A. et al.; An Automated Size Recognition Technique for Acetabular Implant in Total Hip Replacement; International Journal of Computer Science & Information Technology (IJCSIT); vol. 3, No. 2; Apr. 2011; pp. 236-249.
Lehmann, Thomas et al.; IDEFIX—Identification of dental fixtures in intraoral X rays; 12 pages.
Orthopaedic Device Reference; Association of Bone and Joint Surgeons; 1st Edition; 1998; 7 pages.
Alliance Ortho; Jul. 11, 2012; Identified; 2 pages.

(Continued)

*Primary Examiner* — Shefali Goradia
(74) *Attorney, Agent, or Firm* — Stevens & Showalter, LLP

(57) ABSTRACT

Objects implanted in a being are identified by acquiring a first internal medical image of the object from a first perspective; acquiring a second internal medical image of the object from a second perspective different than the first perspective; and receiving descriptive information about the object that is in addition to the first and second internal medical images. The object is identified based on the first internal medical image, the second internal medical image, and the descriptive information; one or more operational characteristics of the object are then determined and transmitted to a remote requestor that provided the first and second internal medical images.

35 Claims, 7 Drawing Sheets

(56) References Cited

OTHER PUBLICATIONS

XT-2500L-Automatic x-ray inspection system for medical applications; MatriX Technologies presents the XT-2500L x-ray system for inline inspection of medical implants; Aug. 2011; 1 page.

Hundley, James D.; OrthopaedicLIST.com Blog; Implant Identification: An Opportunity for you to Participate; Sep. 21, 2009; 2 pages.
Orthopaedic Surgical Implant Identification—OrtopaedicLIST.com; www.orthopaediclist.com/implant-identification.asp; 2008; 2 pages.
Flitton, Greg et al.; Object Recognition using 3D SIFT in Complex CT Volumes; BMVC 2010 doi: 10.5244/C.24.11; 2010; pp. 1-12.

* cited by examiner

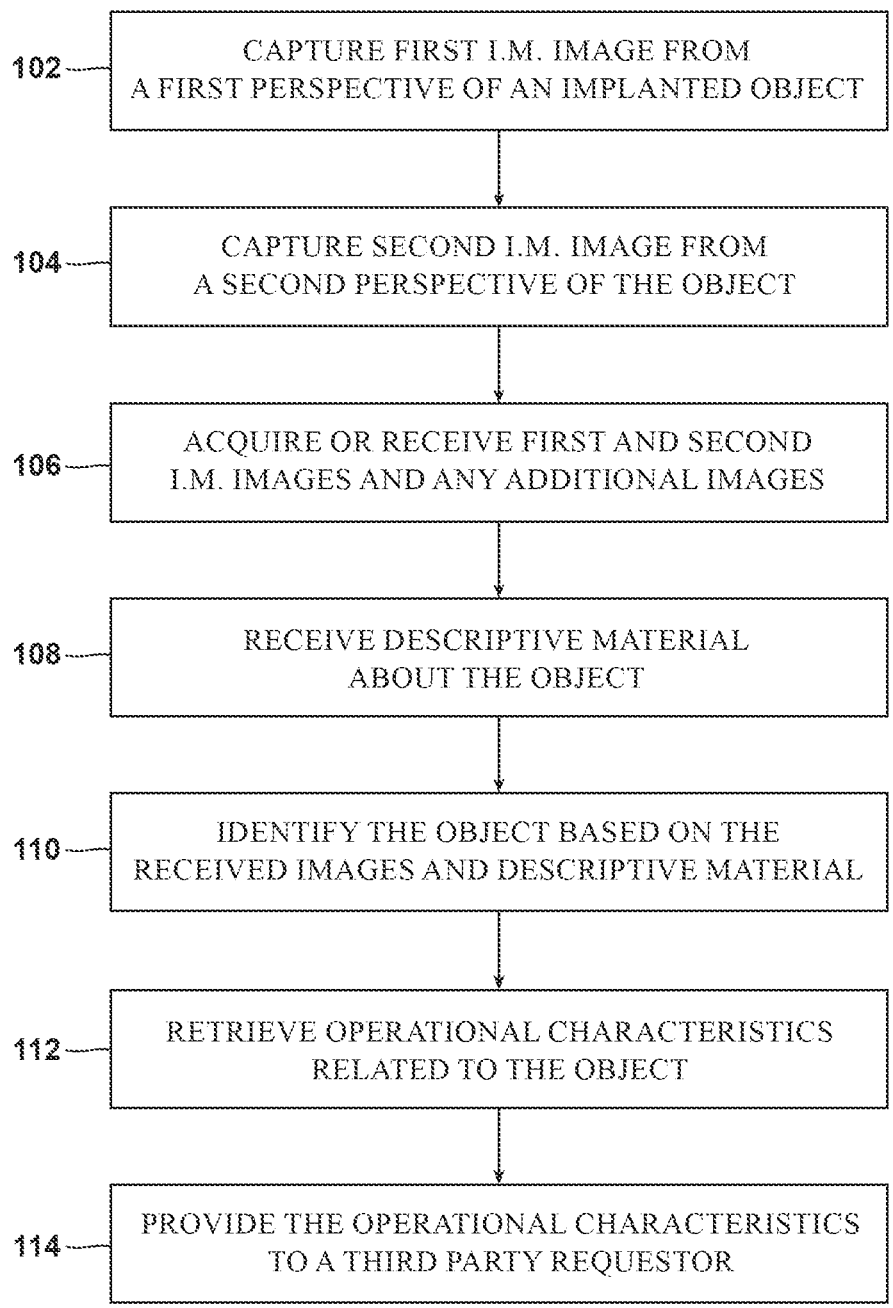

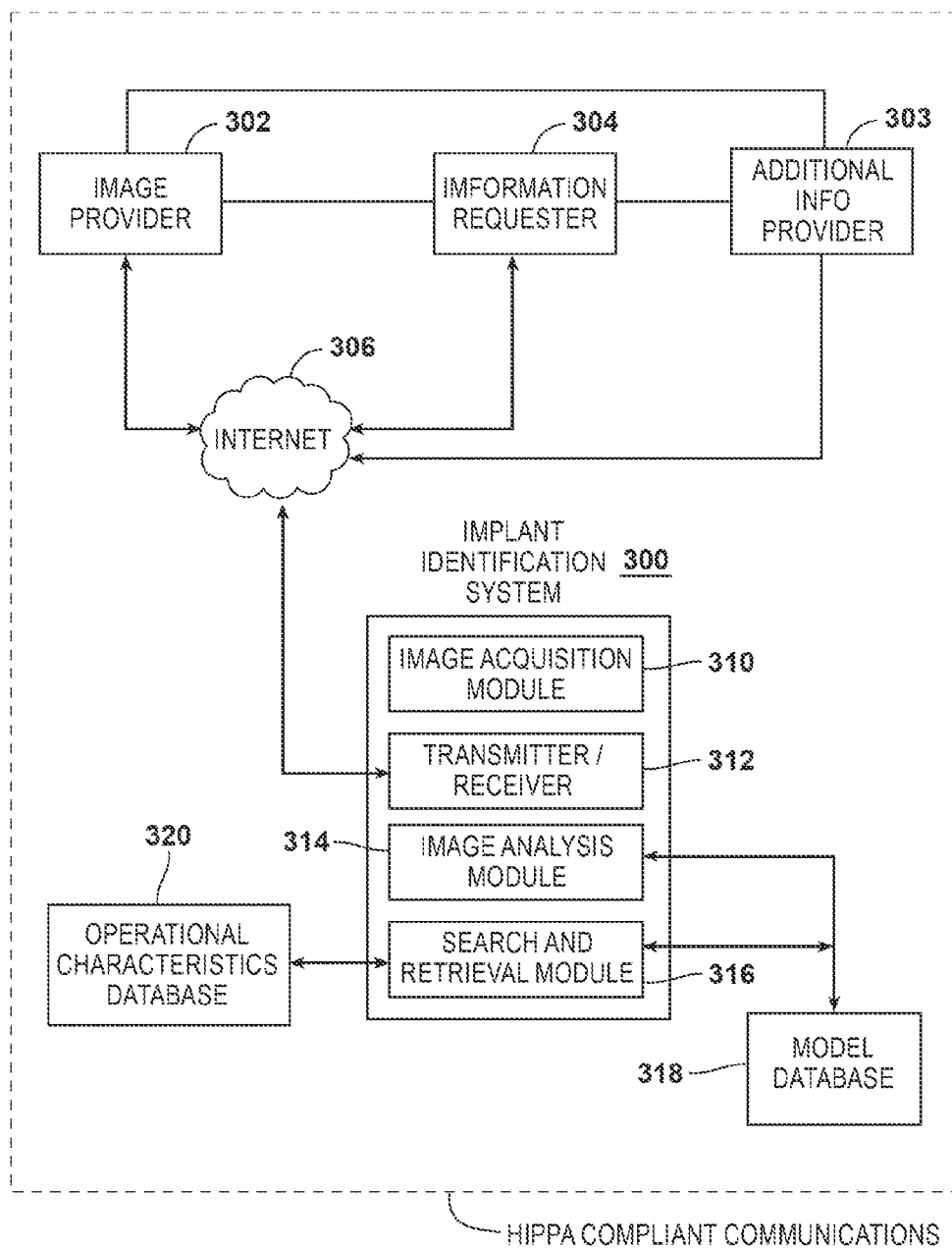

IMPLANT IDENTIFICATION SYSTEM AND METHOD

FIELD OF THE INVENTION

The present invention relates to the field of medical implants and, more particularly to facilitating identification of medical implants.

BACKGROUND OF THE INVENTION

In general, the revision rate for medical implants is growing at a very rapid rate and as the number of patients who have received implants increases, this revision rate will only continue to grow. Patient records may not include specific or accurate identifying information about objects that have been implanted secondary to poor record keeping, lost records or non-existent records due to international travel. The record may indicate that a device was implanted but may not include the specific model, lot, size, varying combinations or other information about the particular implant.

Currently, one method to identify an implant involves x-raying the implant and e-mailing that x-ray to one or more experienced manufacturer representative and asking them to guess at the identity of the implant. Incorrect implant identification can potentially delay onset of surgery, prolong length of surgical time, increase surgical complexity, increase morbidity and/or mortality secondary to increased infections or prolonged anesthetic time, degrade the quality of post-operative mechanical or functional outcome, or increase the potential for additional revision surgery. All of the aforementioned complications will ultimately increase the cost of care.

SUMMARY OF THE INVENTION

Aspects of the present invention relate to a computer-implemented method for identifying an object implanted in a being that includes the steps of acquiring a first internal medical image of the object from a first perspective; acquiring a second internal medical image of the object from a second perspective different than the first perspective; and receiving descriptive information about the object that is in addition to the first and second internal medical images. The method continues with identifying the object based on the first internal medical image, the second internal medical image, and the descriptive information; determining one or more operational characteristics of the object based on the identifying of the object; and transmitting the one or more operational characteristics of the object.

In accordance with an additional aspect of the present invention, a computer program product for identifying an object implanted in a being that includes a computer readable storage medium having computer usable program code embodied therewith. In particular, the computer usable program code includes computer usable program code configured to acquire a first internal medical image of the object from a first perspective and a second internal medical image of the object from a second perspective different than the first perspective; computer usable program code configured to receive descriptive information about the object that is in addition to the first and second internal medical images; computer usable program code configured to identify the object based on the first internal medical image, the second internal medical image, and the descriptive information; computer usable program code configured to determine one or more operational characteristics of the object based on the identifying of the object; and computer usable program code configured to transmit the one or more operational characteristics of the object.

Yet another aspect of the present invention relates to a system for identifying an object implanted in a being that includes an image-acquisition module configured to acquire a first internal medical image of the object from a first perspective and a second internal medical image of the object from a second perspective different than the first perspective; a communications module configured to receive descriptive information about the object that is in addition to the first and second internal medical images; and an image analysis module configured to identify the object based on the first internal medical image, the second internal medical image, and the descriptive information. Furthermore, the system includes an information retrieval module configured to determine one or more operational characteristics of the object based on the identifying of the object; and the communications module is further configured to transmit the one or more operational characteristics of the object.

According to one particular aspect of the present invention, the descriptive information can include any of the following: a geographical location of the being; a geographical location of where the being was when the object was implanted; a date that the object was implanted in the being; partial identification of implant; identification of characteristics; identification of various components; identification of implant fixation; identification of specific primary surgeon or revision surgeon; and the facility of primary or revision surgery.

According to another particular aspect of the present invention, the one or more operational characteristics are selected from a group comprising: what type of implant the object is, the manufacturer of the object, the model of the object, whether the object is subject to a recall, what other devices would be compatible with the object that is identified, what current substitutes are available for the object, what equipment is related to implanting, revising, or replacing the object, a point-of-contact for obtaining a replacement for the object, a material composition of the object, a material texture of the object, and physical dimensions of the object.

In accordance with another particular aspect of the present invention the descriptive information is provided by personnel at the facility where the first and second internal medical images are taken, the facility being remotely located from the system. Also the one or more operational characteristics of the object are transmitted to the facility where the first and second internal medical images are taken.

BRIEF DESCRIPTION OF THE DRAWINGS

While the specification concludes with claims particularly pointing out and distinctly claiming the present invention, it is believed that the present invention will be better understood from the following description in conjunction with the accompanying Figures, in which like reference numerals identify like elements, and wherein:

FIG. 1A depicts a flowchart of an example method of identifying implants in accordance with the principles of the present invention;

FIG. 3 depicts a system for identifying implants in accordance with the principles of the present invention.

DETAILED DESCRIPTION OF THE INVENTION

Figure 1B:
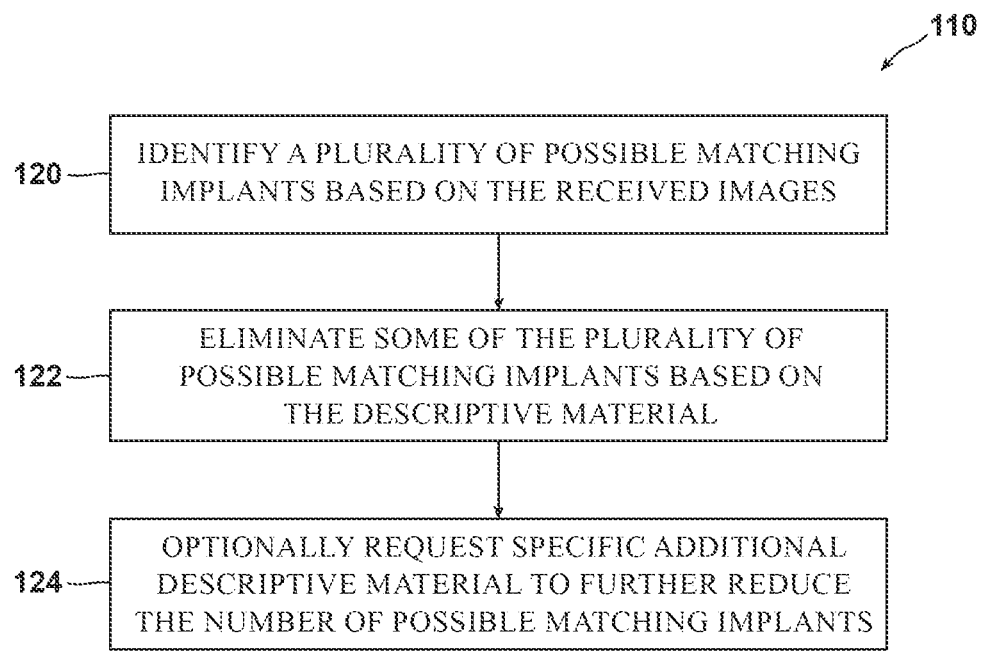
FIG. 1B depicts a flowchart of an example method for refining a selection of matching implants in accordance with the principles of the present invention.

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

One possible methodology for identifying undocumented implants utilizing visual identification from images obtained from varying Radiology modalities may rely on experienced health care providers and/or device manufacturing representatives to guess at the identity of the implant. Incorrect implant identification can potentially delay onset of surgery, prolong length of surgical time, increase surgical complexity, increase morbidity and/or mortality secondary to increased infections or prolonged anesthetic time, degrade the quality of post-operative mechanical or functional outcome, or increase the potential for additional revision surgery. All of the aforementioned complications will ultimately increase the cost of care.

The term "internal medical image" is used herein to encompass any of a wide variety of techniques for capturing images of an implant inside of a patient. Various imaging or scanning technologies are contemplated that allow an image of the implant inside the patient to be acquired in such a way that the implant may be visually distinguished, in the image, from the body tissue in the vicinity of the implant. For example, an internal medical image may be captured using non-invasive techniques such as CT scanning, PET scanning, MRIs, other 3D imaging techniques, X-ray, other radiography techniques, ultrasound scanning, and multi-dimensional ultrasound techniques and invasive techniques involving endoscopy, digital videos or still pictures. Thus, two-dimensional images may be captured using some techniques and higher-dimensional images can be acquired using alternative techniques. Also, one of ordinary skill will recognize that one or more two-dimensional images of the implant can be constructed from volumetric data that may be acquired.

Additionally, some of the examples described herein may refer to particular perspectives used to acquire an internal medical image. These example perspectives are provided merely to help describe specific examples but one of ordinary skill will recognize that internal medical images may be acquired from a wide variety of different perspectives without departing from the scope of the present invention. However, some standardized poses or perspectives or positions may be beneficial according to certain aspects of the present invention. For example, as a minimum, a first internal medical image may be taken from a lateral perspective (i.e., a patient's side facing an x-ray source, for example) and a second internal medical image can be taken from one of a posterior-anterior (i.e., the patient's back facing the, for example, x-ray source) perspective or an anterior-posterior (i.e., the patient's front facing the, for example x-ray source) perspective. Those two internal medical images would provide images of an implant from generally two orthogonal perspectives and may be used to identify many more attributes and features of an implant than merely a single two-dimensional image.

FIG. 1A depicts a flowchart of an example method of identifying implants in accordance with the principles of the present invention. There may be a variety of instances in which it is beneficial to identify an object, such as a medical implant, that has been previously implanted in a patient, such as a person, other living being such as an animal, or a non-living being, such as a cadaver. Before performing surgery or diagnostic tests on a patient, it might be helpful to know what medical implants that patient may have as well as some operational characteristics about the implants. For example, if an implant has been subject to a recall or if an expected life of the implant has expired or if the patient's clinical status warrants intervention and the implant should be replaced or revised, it may be beneficial to know the identity and operational characteristics of any such implants thereby optimizing the surgical technique required to perform a surgical intervention.

There may also be legal or criminal reasons to identify medical implants that were implanted in a patient, even if that patient is no longer living. Thus, embodiments of the present invention are useful to medical personnel as well as non-medical personnel. However, the term "patient" is used herein to generally describe the living or non-living being into which an object, such as a medical-related implant, was implanted.

According to the example flowchart of FIG. 1A, at least two different internal medical images are captured in steps 102 and 104. In particular, each of the two internal medical images are captured from a different perspective (e.g., anterior-posterior, lateral, etc.) and each internal medical image relates to a vicinity around the object implanted in the patient. One of ordinary skill will recognize that a trained technician is typically involved with capturing an internal medical image and will know an appropriate method and region for capturing a useful internal medical image of the implanted object. It is noted that the two captured images could be derived from the same technology, e.g., they could both be x-rays, or they could be derived from different technologies, e.g., one could be an x-ray while the other is an MRI, etc.

Next, in step 106, the captured internal medical images, which may be two or more different images, are acquired by the operator of a system for identifying implants. The personnel that provide the internal medical images to the implant identification system can be located remotely from the implant identification system such as, for example, at a medical facility, a diagnostic lab, a police station, or a lawyer's office. These remotely located personnel will have copies, whether electronic or film, of the internal medical images of the implanted object and can provide them to the implant identification system in a myriad of ways without departing from the scope of the present invention.

In addition to the two internal medical images (or more), various three-dimensional, four-dimensional, and even five-dimensional scans may also be captured of the implanted object. These scans may also be provided to the implant identification system.

In addition to receiving the internal medical images and/or scans, the implant identification system also receives descriptive material about the implanted object that is provided by the personnel who are also providing the internal medical images, or other individuals that may have additional descriptive material regarding the implant. The internal medical images, themselves, may have descriptive material such as how the patient was positioned and possibly other specific information about the physical environment in which the internal medical image was captured. However, in addition to information about the internal medical images, the descriptive material received in step 108 describes knowledge that the personnel have about the implanted object.

The descriptive material may, for example, include a date or timeframe (e.g., the year or a cutoff year if the exact year of implantation is not known, e.g., before 1980) that the object was implanted in the patient, a geographical location (e.g., a country) in which the object was implanted in the patient, the type of material from which the implant is constructed, the type of implant (e.g., hip replacement, spine implant, stent, pacemaker, wrist replacement, elbow replacement, knee replacement, screws, plates, intramedullary nail, wire mesh, heart valve, ankle replacement, dental and maxofacial implants, or other type of medical-related implant.) Descriptive information can also include partial identification of implant, identification of characteristics, identification of various components, identification of implant fixation, identification of specific primary surgeon or revision surgeon, and the facility of primary or revision surgery.

For example, the implant identification system may be implemented as a web-based service. The personnel at the remote location may use a web browser to reach a user interface page provided by the implant identification system. Via the user interface screen, the personnel may be able to attach or otherwise submit the internal medical images and the scan data and also be presented with text-boxes or drop-down menus that allow them to enter descriptive material. In particular, the available drop-down menus and text-boxes may be dynamically generated based on the personnel identifying the type of implant that the implanted object is or by the type of data that is being attached by the personnel. For example, if the implanted object is a stent, then the personnel may be presented with different options and choices for entering the descriptive material as compared to if the implanted object was a hip-replacement. Furthermore, the options and choices may be different if the personnel indicate they are attaching a CT or MRI scan in addition to or instead of the internal medical images.

The implant identification system then uses the received information, in step 110, to identify the implanted object from a database of information about medical-related implants. The identification of the implanted object can be performed in distinct stages. For example, the amount of data in a two-dimensional internal medical image will likely be far less than the data in a three-dimensional scan. Thus, the implant identification system may first attempt to identify the implanted object based on the internal medical images. If identification using the internal medical images does not produce a unique result, then there may be a plurality of implants in the database that possibly match the implanted object.

The provided descriptive material may then be used to further refine the list of possible matching implants. For example, if the material from which the implanted object is constructed is provided as the descriptive material, then that may be used to eliminate choices that were returned as possible matching implants. Along these lines, any type of descriptive information may be used to refine the list of possible matching implants.

The acquisition of the descriptive material may be interactive in nature as well. For example, if the implant identification system determines that there are two possible hip replacement implants in the database that match the characteristics of the internal medical images, then the implant identification system may compare the information in the database for those two possible hip replacement implants. Based on the comparison, the implant identification system may determine that the countries of origin of the two hip replacement implants are different and that the material of their construction is different as well. Based on these distinctions, the implant identification system may send an inquiry message to the personnel asking if the personnel can provide information about where the implant surgery was performed or if they know the material from which the implant is constructed. Based on this specific inquiry, the personnel can provide particular descriptive material that allows the implant identification system to choose the correct hip replacement implant from the database as matching the implanted object.

In some instances, the implant identification system may provide a list of the possible matching implants and allow the personnel to select one or more for receiving additional information. This may be the case, for example, if the implant identification system is unable to limit the possible matching implants down to a single implant.

In step 112, based on the personnel's selection or based on the unique identification of the matching implant, the implant identification system retrieves operational characteristics about the identified matching implant. Different operational characteristics about a medical-related implant may be useful for different uses. But in general, the operational characteristics can include information such as: what type of implant the object is, the manufacturer of the object, the model of the object, whether the object is subject to a recall, what other devices would be compatible with the object that is identified, what current substitutes are available for the object, what equipment is related to implanting, revising, or replacing the object, a point-of-contact for obtaining a replacement for the object, a material composition of the object, a material texture of the object, and physical dimensions of the object, what sizes and tapers and ratios are possible (e.g., cup to liner to head to neck to stem), what heads, leads, valves, mesh and screw to plate are possible, what equipment is needed to be able to revise the implanted object, what are the allowed metallurgy combinations of other implant components, etc. One of ordinary skill will recognize that other operational characteristics may be retrieved in step 112 as well without departing from the scope of the present invention.

In step 114, the operational characteristics of the implanted object are then transmitted to the personnel that provided the internal medical images or, alternatively to other or alternate parties as well. In the web-based example provided above, the personnel may be provided with a report than can be saved or printed. Additionally, the report can be emailed, or otherwise transmitted, to the personnel or other third parties that they designate. An additional feature of the system is that it may have the ability to communicate with various electronic medical record (EMR) systems for direct download into the patient's medical record, such that one or more operational characteristics of the implant may be obtained automatically from the system. The implant identification system may also access EMR systems to upload descriptive material about the patient's implants.

The operational characteristics identified by the implant identification system may or may not go to the facility where the images were taken. For example the images may be sent from a patient, a surgeon's phone or mobile device, a surgeon's computer, a hospital, a surgery center, an attorney's office, etc. Thus, while the images may be sent from a location where they are taken, the images can also be sent from locations that are distant from where the images were taken. Similarly, the descriptive material may be sent from a device or location from which the images were sent or can be from an entirely separate location or party.

FIG. 1B depicts a flowchart of an example method for refining a selection of matching implants in accordance with the principles of the present invention. As mentioned above, in describing step 110, the implant identification system may initially, in step 120, identify a plurality of possible matching implants based on the received internal medical images and descriptive information. If available, any three-dimensional scan information may then be used to see if any of the possible matching implants can be eliminated from the list of possible matches.

Additionally, the descriptive material that the personnel initially submit may be used, in step 122, to eliminate as many possible matching implants from the list of possible matches. As an option, in step 124, the implant identification system can request specific additional descriptive material to further reduce the number of possible matching implants.

Figure 2A:
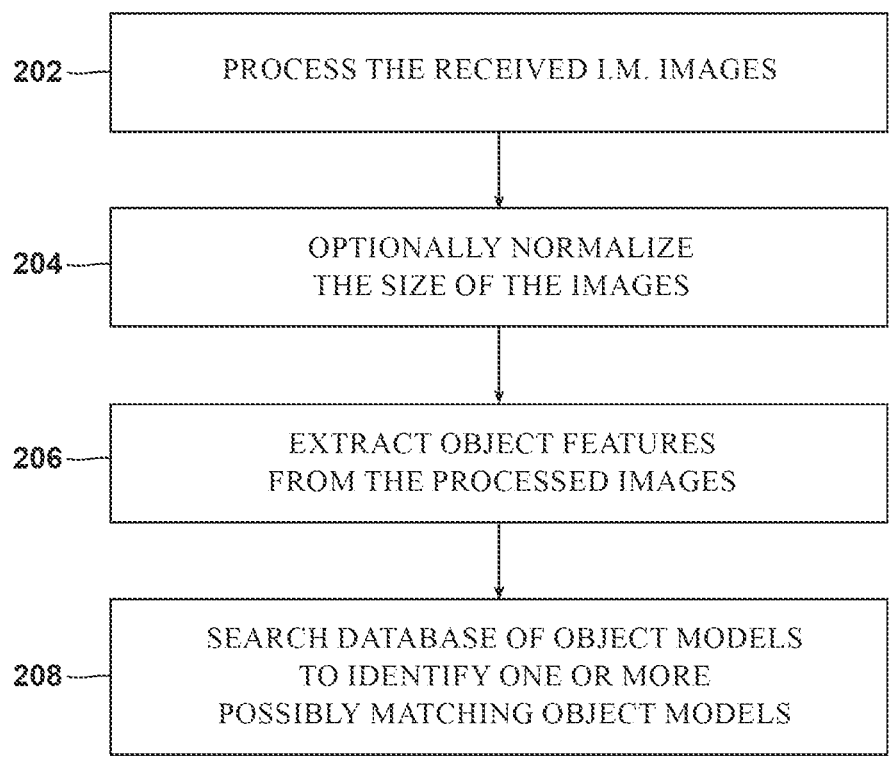
FIG. 2A depicts a flowchart of an example method for identifying matching implants in a database in accordance with the principles of the present invention.

FIG. 2A depicts a flow chart of an example method for identifying matching implants in a database in accordance with the principles of the present invention. One of ordinary skill will recognize that there are a variety of different techniques to perform object recognition. Different techniques are useful when there is a priori knowledge about the internal medical images (e.g., two images are available from mutually orthogonal perspectives; or the images are gray scale images) or there is a priori knowledge about the subject of the images (e.g., the subject of the image is an anterior-posterior view of a knee replacement implant). There are also a number of known techniques for using three-dimensional data to generate two dimensional slices of an implanted object as well as using two dimensional images from different perspectives to calculate volumetric data about an implanted object. Embodiments of the present invention encompass using any of the widely varied and known techniques to recognize and identify objects in an image, such as image pattern recognition algorithms, computer-assisted detection programs, computer-assisted diagnosis programs, or content-based image retrieval software.

In step 202, the implant identification system may initially process the received internal medical images and/or any scan data. For example, the internal medical images may be filtered to sharpen edges and to remove noise and other artifacts that may obscure details about the internal medical images. The contrast and other image pixel values may be normalized or otherwise altered to generate a internal medical image in a desired format for use by the implant identification system.

In step 204, the implant identification system may normalize the size of any internal medical images that are received, e.g., the system may re-size the internal medical images to a predetermined size. For example, the internal medical image may initially be captured with a phantom object of a known length. The implant identification system will expect the presence of such a phantom and also search for the location in predetermined regions in each internal medical image. Using the presence and size of the phantom of a known length, the implant identification system can re-size the internal medical image to a predetermined resolution (e.g., 10 pixels equal 1 mm) and allow the implant identification system to calculate physical dimensions of the implanted object. One of ordinary skill will recognize that there are also other techniques that can be used to embed dimensional information in the internal medical image itself.

In step 206, the implant identification system analyzes each internal medical image to extract features (e.g., textures, lines, densities, boundaries, corners, edges, transitions, center-of-mass, angles, etc.) of the implanted object. Having at least two internal medical images available for feature extraction allows more robust information to be determined for the implanted object in the images. For example, a single two-dimensional image only provide distance in the plane of the image to be calculated but additional images allow three-dimensional distances between object features to be determined as well.

The particular object features and physical dimensions and ratios that may be extracted in step 206 can vary depending on the type of implant. For example, a spine implant may have different features of interest than an ankle implant.

Accordingly, the implant identification system might rely on the personnel submitting the internal medical images to identify (at least tentatively) the implanted object. Alternatively, the implant identification system may employ an initial process that first identifies the type of implant that the implanted object likely is. Once the type of implant is identified, then the predetermined features of interest for that type of implant can be retrieved and used to control what features are extracted from the internal medical images in step 206.

The implant identification system includes a database of implant models that describe the physical features of each implant and may also include respective images of each implant from a variety of perspectives. The database can also include, for example, engineering design data and computer-aided-drafting (CAD) drawings of each implant. In general, each implant model is a description of that implant that can be used to compare to the features that are extracted from an image in step 206. Thus, in step 208, the implant identification system searches the database of implant models to identify the one (or possibly more) implant models that have dimensions or features that are similar to the implanted object of the provided internal medical images.

The search and identification of matching implant models from the database does not necessarily have to be a binary decision of match/mismatch. Instead, the similarity between an implant model and the features of the implanted object can be scored so that relative scores between different implant models can be compared.

For example a score from 0-100 can be calculated that indicates how similar the extracted features of the implanted object are to the data within an implant model. The implant identification system can then use heuristics to determine what results to provide the personnel who submitted the internal medical images or any other third party. For example, if five implant models received a score between 60 and 85, then the implant identification system may select the highest scoring model as potentially matching the implanted object. Also, for example, if no implant model has a score over 40, then the implant identification system may report that no matching implant models were found. Also, if two different implant models both receive a score over 95, then the implant identification system may report that two matches were found or may use additional descriptive material to eliminate one of the matches or additional images may be requested as described herein.

Figure 2B:
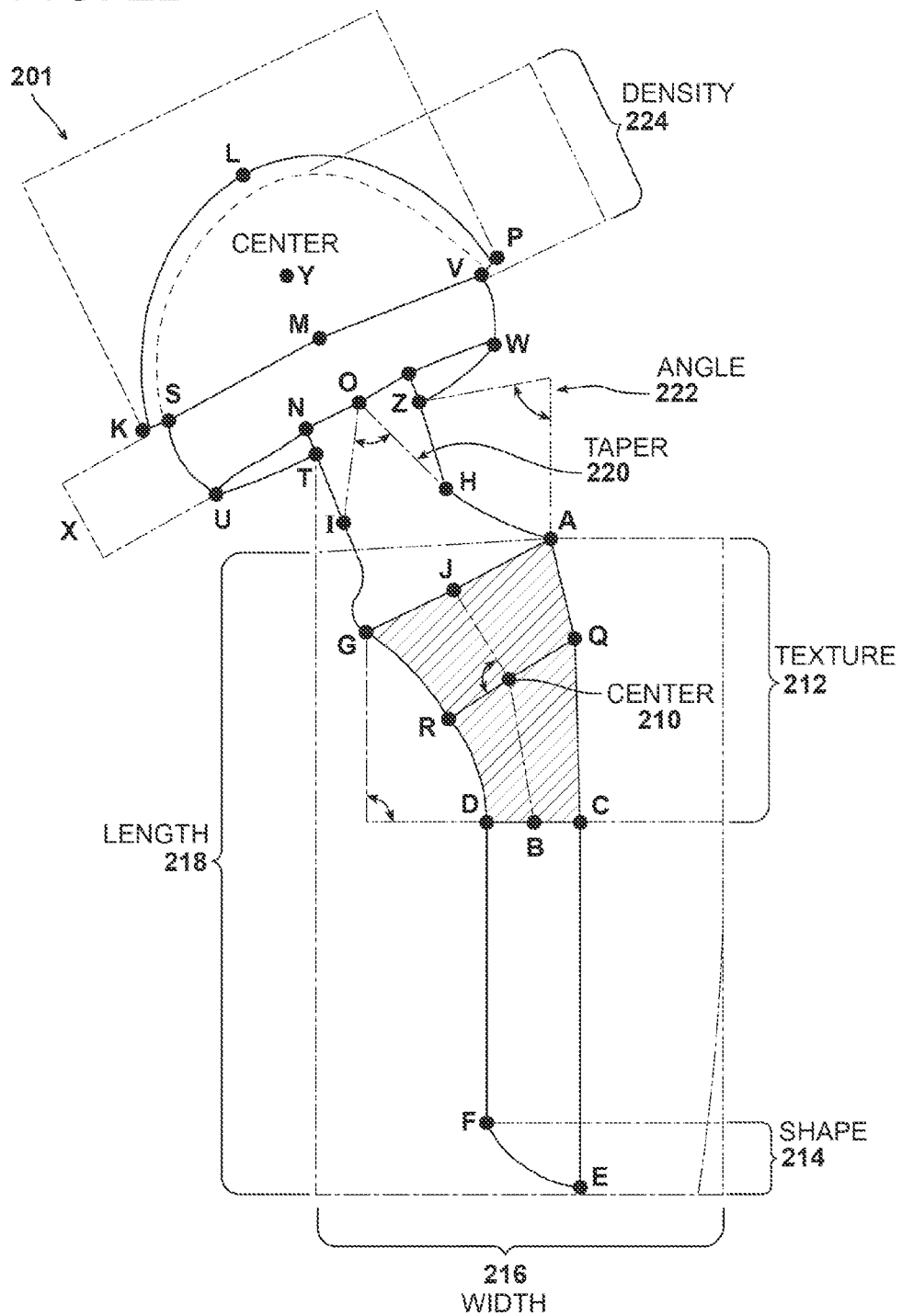
FIGS. 2B-2D depict an example hip implant having example features of interest marked with circles.
Figure 2C:
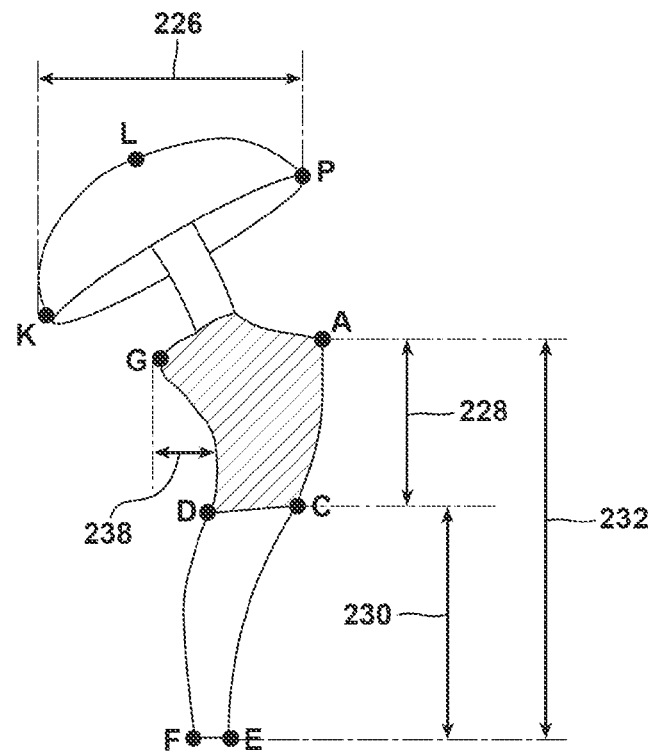
Figure 2D:
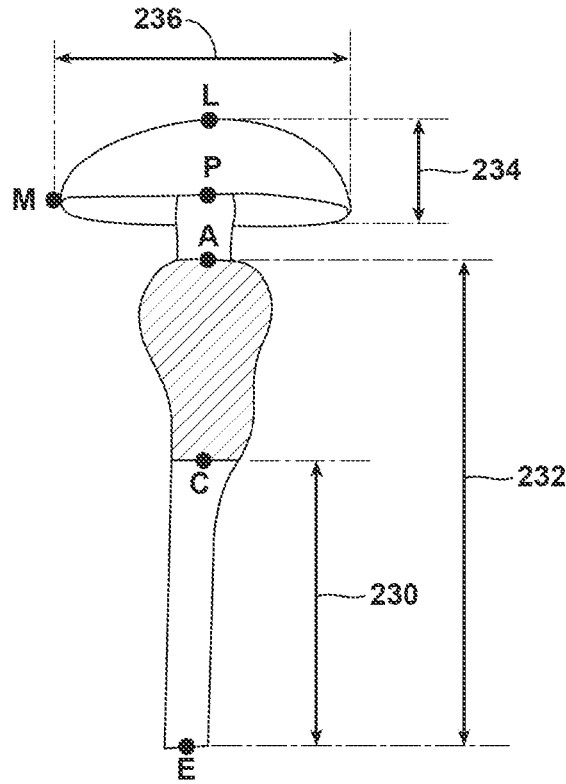

FIG. 2B-2D depict an example hip implant 201 having example features of interest marked with circles that each have a letter label. FIG. 2B is provided merely by way of example to illustrate how different points A-Z on an implant 201 can be utilized. For example, the polygonal region bounded by points A-Q-C-B-R-G-J can be analyzed by the system in such a way to identify the material composition of this region. For example, the texture 212 of this region and/or its density may be used to help identify its composition (e.g., stainless steel, ceramic, teflon, etc.). The curve between points F-E can be analyzed by the system to identify its "shape" 214. Some of the points of interest used for one purpose can also be used for other purposes. For example, the length 218 between points A-E can be used to describe one feature (e.g., femoral hip stem length) of the hip implant 201. Similarly, the density 224 of the image region bounded by points K-L-P-M can be used to identify its material composition. In this way, the material composition of the acetabular liner along with the composition of the femoral hip neck and hip head may help identify the specific hip implant 201. A width between points K-P or between points T-A can also be calculated.

The region bounded by the points S-M-V-W-O-N-U-S may pertain to an amount (length X) that the femoral head extends below the acetabular liner. This feature of the hip implant 201 may be useful in its identification. An angle 222 between points A-Z can be extracted as can a taper 220 using points I-O-H. The distances between point U-T or Z-W may be helpful in determining characteristics about the femoral head of the hip implant 201. Additionally, a center point 210 of a region (or the entire implant 201) can be located as a point, or feature, or interest. In this way, the points of interest 210 provide a way to capture the physical dimension of implant 220 that may help to find similar implant models in the database of implant models.

In addition to the physical dimensions, ratios between various dimensions can be calculated as well using the points A-Z of FIGS. 2B-2D. For example, the two different views of the hip implant 201, as shown in FIGS. 2C and 2D illustrate example lengths (or widths) 226, 228, 230, 232, 234, 236, and 238. One of ordinary skill will recognize that a plurality of other physical dimensions could also be extracted using the points A-Z as shown in FIG. 2B. These different physical dimensions allow a number of ratios to be calculated as well. For example, the ratio between 226 and 232 may be helpful in identifying the hip implant 201.

Thus, the internal medical images can be used to calculate, identify or determine such features of the hip implant 201 as volume, contrast, size, shape, length, width, texture, angles, density, height, area, configuration, combination, position, direction, and location. The points of interest visible in one image or across multiple images can also be used, in conjunction with the above physical attributes, to create one or more ratios. These ratios and physical attributes can be used in various combinations in order to automatically identify a specific implant. One benefit of using ratios as identifying features is that these ratio values are useful even if a provided internal medical image and corresponding images of the implant identification system have different image resolutions or sizes.

FIG. 3 depicts a system for identifying implants in accordance with the principles of the present invention. FIG. 3 provides a block-level diagram of a computer-based system that can be used to implement the methods described above with reference to FIG. 1A, FIG. 1B, and FIG. 2A. As such, some of the details described before are not fully described again. However, the messages and their contents and information that are exchanged between parties and that may be included in the various databases are intended to encompass the broad range of information described earlier. As shown by the dotted outline around the communicating parties, each communication may be performed in such a way as to comply with all Health Insurance Portability and Accountability Act of 1996 (HIPPA) requirements or those of similar privacy-related regulations.

An image provider 302 and an information requester 304 are shown as separate entities in FIG. 3. However, these two entities may also be the same as was described with reference to FIG. 1A. Regardless of whether or not they are separate entities, the image provider 302 may communicate with the implant identification system 300 to provide internal medical images, possibly scan data, and other descriptive material about an implanted object. The information requestor 304 or another information provider 303 may also provide additional images and other descriptive material about the implanted object. In addition, only a single, respective image provider 302, information requester 304, and additional information provider 303 are shown in FIG. 3. However, more than one image provider, information requester, or additional information provider can exist at different locations without departing from the scope of the present invention.

The image provider 302 may be located remotely from the implant identification system 300 and communicate using the internet 306 or other network. The implant identification system 300 includes a transmitter/receiver 312 that can receive information from the internet 306 and also transmit information over the internet 306 as well. For example, the implant identification system 300 can include a web server front-end that receives information from a web browser and provides information in a format to be displayed on a web browser.

In particular, the transmitter/receiver 312 can receive internal medical image information and possibly three-dimensional scan information that can be passed to an image acquisition module 310. The image acquisition module 310 may communication with an image analysis module 314. In particular, the internal medical images acquired by the image acquisition module 310 can be analyzed by the image analysis module 314 to extract features and physical attributes related to the implanted object that is the subject of the acquired internal medical images.

An implant model database 318, as described earlier, can include data and images that describe a particular medical-related implant. The model database 318 can include such information for a plurality of different implants and implant types. This information can be collected from implant suppliers and historical data that is available in paper and electronic form. More particularly, as much physical dimension information, images and drawings are collected in the model database 318 that will allow comparison of images of implanted objects with the database 318 in order to identify possible matching implant models. The search and retrieval module 316 works in conjunctions with the image analysis module 314 to identify which implant model(s) in the model database 318 matches the implanted object in internal medical images provided by the image provider 302 or information requester 304.

In addition to the information in the model database 318 that allows identification of matching implant models, the implant identification system 300 also includes an operational characteristics database 320 with respective operational characteristics for each of the implant models in the model database 318. The operational characteristics database 320 includes additional information, as described earlier, that may be useful for medical, legal, or criminal reasons in relationship to the patient or the implanted object in the patient. The search and retrieval module 316 retrieves the operational characteristics of the matching implant model from the database 320 and forwards that to the image provider personnel 302 or an information requester 304.

The implant identification system may be implemented as a web based business method, for example. The personnel providing the internal medical images may be a one-time user that can be charged on a per-use basis, but more realistically, these personnel can be subscribers to an implant identification service and be charged on a subscription basis or a combination of subscription plus per-use basis.

The implant identification service builds the initial implant model database and operational characteristics database utilizing available books, industry information, electrical records, and subject-matter experts. Access to these databases provides value for which the implant identification service can charge a subscription fee.

The personnel providing the internal medical images are provided login permission to the implant identification service and can submit internal medical images, scan information, and additional descriptive material. In return, the implant identification service will identify a possibly matching implant from their databases and also provide operational characteristic information to the internal medical image provider about the implanted object. The implant identification service can (in a way that protects patient privacy) also collect the information submitted by various internal medical image providers and optionally augment their databases with this additional information. Additionally, internal medical image providers may be able to upload implant information and be rewarded with a reduced subscription fee.

While any of a wide variety of additional descriptive material can be sent to the implant identification system to assist in identifying implants, some specific examples discussed above include: location of primary surgery, location of revision surgery, year or date range of surgery, cemented/non-cemented, modular, non-modular, articulation surface, coating, texture, taper, neck angel, size, manufacturer, additional manufacturers, type of implant, location of implant, material that the implant is made from, surgeon who put implanted the primary implant, surgeon who implanted the revision implant, year of the patient's birth, name or location of the medical facility where the implant was implanted, the manufacturer of other implants in the patient, other known implants in the patient, (e.g., from the contra-lateral side), and bearings surface.

In addition, the operational characteristics which the implant identification provides can include a wide variety of information as well. Some examples discussed above include: what type of implant the object is, the manufacturer of the object, the model of the object, whether the object is subject to a recall, what other devices would be compatible with the object that is identified, what current substitutes are available for the object, what equipment is related to implanting, revising, or replacing the object, a point-of-contact for obtaining a replacement for the object, a material composition of the object, a material texture of the object, and physical dimensions of the object, surgical technique for that implant, consulting options to discuss that implant, and places to refer that implant. Additional example information can include: the year of manufacture of the implant, the bearing services available, marketing information related to the implant of substitute implants, educational opportunities related to the implant or substitute implants, taper, metallurgy, compatibility, and registry data related to the implant.

Some benefits of the implant identification system described above may include reduced operating room time, reduced surgical time, reduced time to surgery, reduced time to implant identification, reduction in incorrect equipment and implants in the operating room, reduced infections due to reduced operating room time and the amount of implants being implanted in the patient, reduced cost to the healthcare system, reduced number of implants needed in revision, shorter lengths of stay for a patient in the medical facility, decreased patient morbidity, reduced patient mortality, better alignment and outcomes due to proper equipment and instruments in surgery, decreased resources needed to identify an implant, and decreased amount of time needed to identify implants.

Figure 4:
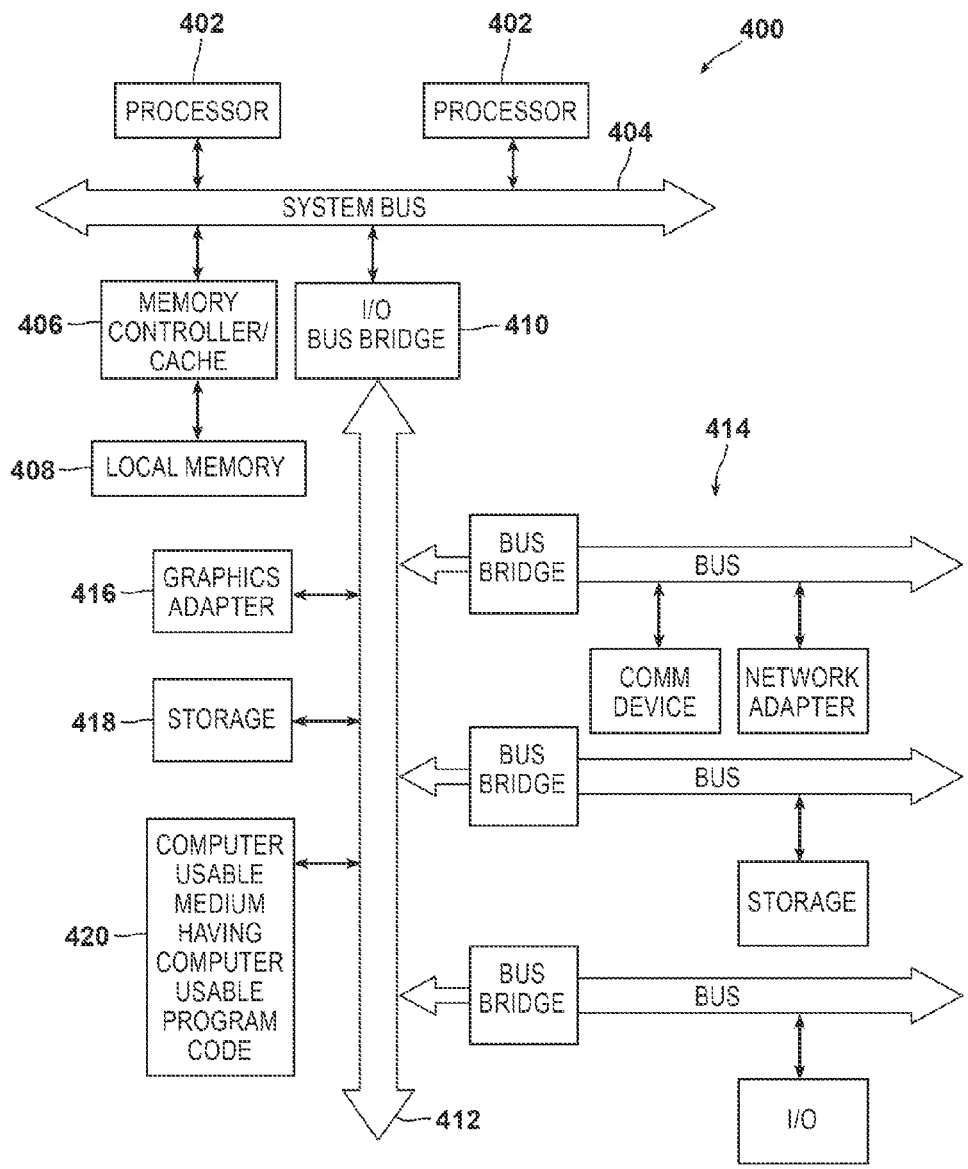
FIG. 4 is a block diagram of a data processing system in accordance with the principles of the present invention.

Referring to FIG. 4, a block diagram of a data processing system is depicted in accordance with the present disclosure. A data processing system 400, such as may be utilized to implement the implant identification system 300 or aspects thereof, e.g., as set out in greater detail in FIG. 1A-FIG. 3, may comprise a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more busses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspects of any of the methods, computer program products and/or system components illustrated in FIG. 1A-FIG. 3.

Aspects of the present disclosure may be implemented entirely via hardware, entirely via software (including firmware, resident software, micro-code, etc.) or by combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read -only memory (EPROM or Flash memory), an appropriate optical fiber with a repeater, a magnetic storage device, or any suitable combination of the foregoing. In the context of this document, a computer readable storage medium may be any tangible medium that can contain, or store a program for use by or in connection with an instruction execution system, apparatus, or device.

In contrast, a computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, conventional procedural programming languages, dynamic programming languages or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A computer-implemented method for identifying an object implanted in a being, the method comprising:
   acquiring, by a computer, a first internal medical image of the object from a first perspective;
   acquiring, by the computer, a second internal medical image of the object from a second perspective different than the first perspective;
   receiving, by the computer, descriptive information about the object that is in addition to the first and second internal medical images;
   identifying, by the computer, the object based on the first internal medical image, the second internal medical image, and the descriptive information wherein the computer determines a list of a plurality of possible matching objects based on the first and second internal medical images and identifies the object from the list;
   determining one or more operational characteristics of the object based on the identifying of the object; and
   transmitting, by the computer, the one or more operational characteristics of the object.

2. The method of claim 1, further comprising:
   generating at least a partial three-dimensional representation of the object based on the first internal medical image and the second internal medical image.

3. The method of claim 1, wherein the descriptive information is provided by personnel at the facility where the first and second internal medical images are taken, the facility being remotely located from the computer.

4. The method of claim 3, wherein the one or more operational characteristics of the object are transmitted to the facility where the first and second internal medical images are taken.

5. The method of claim 1, wherein the being is a human and the object is one of an orthopedic implant, a spine implant, a stent, a heart valve, and a medical-related implant.

6. The method of claim 1, wherein the first perspective is a lateral perspective, and the second perspective is one of: an anterior-posterior perspective and a posterior-anterior perspective.

7. The method of claim 1, further comprising:
   automatically re-sizing the first and second internal medical images to a predetermined size; and
   comparing the re-sized first and second internal medical images to a database of object models.

8. The method of claim 1, further comprising:
   transmitting a request for additional details about the object;
   receiving the descriptive information in response to the request; and
   utilizing the received descriptive information to identify the object from the list.

9. The method of claim 8, wherein the descriptive information includes one of: a geographical location of the being; a geographical location of where the being was when the object was implanted; and a date that the object was implanted in the being.

10. The method of claim 1, wherein the one or more operational characteristics are selected from a group comprising: what type of implant the object is, whether the object is subject to a recall, what current substitutes are available for the object, what equipment is related to replacing the object, a point-of-contact for obtaining a replacement for the object, a composition of the object, and physical dimensions of the object.

11. The method of claim 1, further comprising:
   identifying a plurality of points of interest within one or both of the first and second internal medical images, wherein identifying the object is based, at least in part, on the plurality of points of interest.

12. A system for identifying an object implanted in a being, the system comprising:
   a computer configured to execute instructions in an accessible memory;
   the computer when executing instructions stored in the accessible memory:
      acquires a first internal medical image of the object from a first perspective and a second internal medical image of the object from a second perspective different than the first perspective;

receives descriptive information about the object that is in addition to the first and second internal medical images;

identifies the object based on the first internal medical image, the second internal medical image, and the descriptive information, wherein the computer identifies the object by:
  determining a list of a plurality of possible matching objects based on the first and second internal medical images; and
  identifying the object from the list;

determines one or more operational characteristics of the object based on the identifying of the object; and transmits the one or more operational characteristics of the object.

13. The system of claim 12, wherein the computer when executing instructions stored in the accessible memory generates at least a partial three-dimensional representation of the object based on the first internal medical image and the second internal medical image.

14. The system of claim 12, wherein the descriptive information is provided by personnel at the facility where the first and second internal medical images are taken, the facility being remotely located from the system.

15. The system of claim 14, wherein the one or more operational characteristics of the object are transmitted to the facility where the first and second internal medical images are taken.

16. The system of claim 12, wherein the being is a human and the object is one of an orthopedic implant, a spine implant, a stent, a heart valve, and a medical-related implant.

17. The system of claim 12, wherein the first perspective is a lateral perspective, and the second perspective is one of: an anterior-posterior perspective and a posterior-anterior perspective.

18. The system of claim 12, wherein the computer when executing instructions stored in the accessible memory:
  automatically re-sizes the first and second internal medical images to a predetermined size; and
  compares the re-sized first and second internal medical images to a database of object models.

19. The system of claim 12, wherein the computer when executing instructions stored in the accessible memory:
  transmits a request for additional details about the object; and
  receives the descriptive information in response to the request; and
  utilizes the received descriptive information to identify the object from the list.

20. The system of claim 19, wherein the descriptive information includes one of: a geographical location of the living being; a geographical location of where the being was when the object was implanted; and a date that the object was implanted in the being.

21. The system of claim 12, wherein the one or more operational characteristics are selected from a group comprising: what type of implant the object is, whether the object is subject to a recall, what current substitutes are available for the object, what equipment is related to replacing the object, a point-of-contact for obtaining a replacement for the object, a composition of the object, and physical dimensions of the object.

22. A computer program product for identifying an object implanted in a being, the computer program product comprising:

a non-transitory computer readable storage medium having computer usable program code embodied therewith, the computer usable program code comprising:
  computer usable program code configured to acquire a first internal medical image of the object from a first perspective and a second internal medical image of the object from a second perspective different than the first perspective;
  computer usable program code configured to receive descriptive information about the object that is in addition to the first and second internal medical images;
  computer usable program code configured to identify the object based on the first x-ray image, the second internal medical image, and the descriptive information, the computer usable program code configured to determine a list of a plurality of possible matching objects based on the first and second internal medical images and to identify the object from the list;
  computer usable program code configured to determine one or more operational characteristics of the object based on the identifying of the object; and
  computer usable program code configured to transmit the one or more operational characteristics of the object.

23. The computer program product of claim 22, further comprising:
  computer usable program code configured to generate at least a partial three-dimensional representation of the object based on the first internal medical image and the second internal medical image.

24. The computer program product of claim 22, wherein the descriptive information is provided by personnel at the facility where the first and second internal medical images are taken, the facility being remotely located from the system.

25. The computer program product of claim 24, wherein the one or more operational characteristics of the object are transmitted to the facility where the first and second internal medical images are taken.

26. The computer program product of claim 22, wherein the being is a human and the object is one of an orthopedic implant, a spin implant, a stent, a heart valve, and a medical-related implant.

27. The computer program product of claim 22, wherein the first perspective is a lateral perspective, and the second perspective is one of: an anterior-posterior perspective and a posterior-anterior perspective.

28. The computer program product of claim 22, further comprising computer usable program code configured to:
  automatically re-size the first and second internal medical images to a predetermined size; and
  compare the re-sized first and second internal medical images to a database of object models.

29. The computer program product of claim 22, further comprising computer usable program code configured to:
  transmit a request for additional details about the object;
  receive the descriptive information in response to the request; and
  utilize the received descriptive information to identify the object from the list.

30. The computer program product of claim 29, wherein the descriptive information includes one of: a geographical location of the being; a geographical location of where the being was when the object was implanted; and a date that the object was implanted in the being.

31. The computer program product of claim 22, wherein the one or more operational characteristics are selected from a group comprising: what type of implant the object is, whether the object is subject to a recall, what current substitutes are available for the object, what equipment is related to replacing the object, a point-of-contact for obtaining a replacement for the object, a composition of the object, and physical dimensions of the object.

32. A method for identifying an object implanted in a being, the method comprising:
- capturing a first internal medical image of the object from a first perspective;
- capturing a second internal medical image of the object from a second perspective different than the first perspective;
- transmitting, to a remotely located implant identification service, the first and second internal medical images along with descriptive information about the object that is in addition to the first and second internal medical images, wherein the remotely located implant identification service is configured to identify the object by:
  - determining a list of a plurality of possible matching objects based on the first and second internal medical images; and
  - identifying the object from the list;
- receiving from the remotely located implant identification service an identification of the object and one or more operational characteristics of the object.

33. The method of claim 32, further comprising:
- receiving a request for additional details about the object;
- transmitting the descriptive information in response to the request; and
- wherein the remotely located implant identification service is configured to utilize the transmitted descriptive information to identify the object from the list.

34. A computer-implemented method for identifying an object implanted in a being, the method comprising:
- capturing a first internal medical image of the object from a first perspective;
- capturing a second internal medical image of the object from a second perspective different than the first perspective;
- transmitting, to a remotely located implant identification service, the first and second internal medical images along with descriptive information about the object that is in addition to the first and second internal medical images;
- acquiring, by a computer associated with the remotely located implant identification service, the first and second internal medical images;
- receiving, by the computer, descriptive information about the object that is in addition to the first and second internal medical images;
- identifying, by the computer, the object based on the first internal medical image, the second internal medical image, and the descriptive information, wherein the computer identifies the object by:
  - determining a list of a plurality of possible matching objects based on the first and second internal medical images; and
  - identifying the object from the list;
- determining, by the computer, one or more operational characteristics of the object based on the identifying of the object;
- transmitting, by the computer, the one or more operational characteristics of the object; and
- receiving from the remotely located implant identification service an identification of the object and the one or more operational characteristics of the object.

35. The method of claim 34, further comprising:
- receiving a request for additional details about the object;
- transmitting, to the remotely located implant identification service, the descriptive information in response to the request; and
- wherein the computer is configured to utilize the transmitted descriptive information to identify the object from the list.

* * * * *